United States Patent Office

3,133,932
Patented May 19, 1964

---

3,133,932
PRODUCTION OF 2-OXAZOLIDINONES
Robert C. Horn, Sam M. Moffett, and Louis E. Craig, Pryor, Okla., assignors to Deere & Company, Moline, Ill., a corporation of Delaware
No Drawing. Filed May 25, 1959, Ser. No. 815,241
13 Claims. (Cl. 260—307)

This invention relates to an improved process for the production of 2-oxazolidinones having the formula

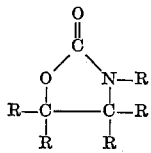

wherein R represents a member of the group consisting of hydrogen, lower alkyl, lower hydroxyalkyl, phenyl, benzyl, chlorophenyl, methylphenyl, hydroxyphenyl, dihydroxyphenyl and trihydroxyphenyl, and wherein no more than one of the R groups is other than hydrogen.

The 2-oxazolidinones are physiologically active, and have a number of industrial uses. They may be converted, by heating, to polyethyleneimines which are used in textile treatment.

In accordance with the invention, 2-oxazolidinones are prepared by the thermal decomposition of β-hydroxyethylurea or substituted β-hydroxyethylureas dissolved in an inert solvent. Inasmuch as β-hydroxyethylurea and substituted β-hydroxyethylureas are rather expensive, the invention in its preferred form contemplates the preparation of these materials in a continuous process by the reaction of inexpensive urea with ethanolamine or a suitable substituted ethanolamine, in an inert solvent which is also a solvent for the resulting β-hydroxyethylurea or substituted β-hydroxyethylurea, the process also involving the thermal decomposition of the β-hydroxyethylurea or substituted β-hydroxyethylurea formed in situ.

The above mentioned reactions are illustrated by the following equations:

(I) 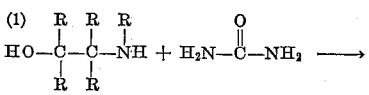

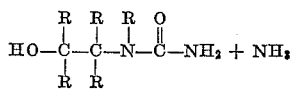

(II) 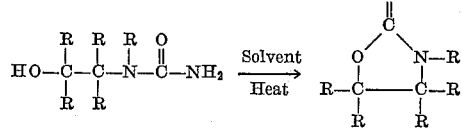

wherein R has the same significance given above.

We are aware of previous publications in the art suggesting the preparation of oxazolidinones by heating β-hydroxyethylurea (Knorr and Rossler, Berichte, 36, 1278–83 (1903)), or by heating urea and ethanolamines (Paquin, Z. Naturforsch, 1, 518–23 (1946)); C.A. 42, 124 (1948). We have, however, repeated the procedures of Knorr et al. and of Paquin, and have found them unsuitable. For example, following the procedure of Knorr et al., β-hydroxyethylurea (20.8 g., 0.2 mole) was heated in a vacuum (2–4 mm.) until all distillable material had been recovered, and the distillate then recrystallized from chloroform to give 6.7 g. of 2-oxazolidinone. This represents a yield of only 38.5% of theory. Following the procedure of Paquin, equimolar quantities of urea and ethanolamine were heated for 16 hours at reflux, at a temperature of about 170° C. to about 200° C. and then subjected to vacuum distillation (2–3 mm.), a small amount of distillate being produced. In a number of trials of Paquin's procedure, using his published conditions as well as variations thereof, consistently poor yields of 2-oxazolidinone of 6–19% of theory were obtained.

The present invention is based on our discovery that high yields of 2-oxazolidinones are unexpectedly obtained when β-hydroxyethylurea (or substituted β-hydroxyethylurea), or alternatively equimolar quantities of urea and ethanolamines (or substituted ethanolamines), are heated in the presence of a solvent therefor which is also a solvent for β-hydroxyethylurea or substituted β-hydroxyethylurea, and which is substantially unreactive with any of these materials.

Accordingly, it is an object of the invention to provide a new and simple process for producing 2-oxazolidinones in high yield and purity from relatively inexpensive materials.

It is a more specific object to provide a process for producing 2-oxazolidinones by the thermal decomposition of β-hydroxyethylurea or substituted β-hydroxyethylureas dissolved in a substantialy inert solvent therefor.

A further object of the invention is to provide a method for producing 2-oxazolidinones by heating a solution of urea and ethanolamine, or of urea and a substituted ethanolamine, in a suitable solvent.

Other objects will in part be obvious and in part pointed out hereinafter.

Referring to the above equations, the β-hydroxyethylurea or substituted β-hydroxyethylurea which is produced in reaction (I) begins to form at about 130 to 140° C., as the reaction mixture is heated. Reaction (II), which results in the ring closure of the substituted or unsubstituted β-hydroxyethylurea with the loss of ammonia, starts at about 150° C. Preferably, the reactants for reaction (I) are incorporated in a suitable solvent and the resulting mass placed in an appropriate reaction vessel and heated, whereby the substituted or unsubstituted β-hydroxyethylurea is formed as an intermediate compound and is thereafter decomposed to form the corresponding 2-oxazolidinone, the two reactions taking place in the same vessel and without interruption. The course of the reactions may be readily followed by measurement of the ammonia evolution. By this procedure, the over-all reaction is complete in about six hours at 160° C. Raising the reaction temperature to about 175° C. results in a shortening of the reaction time by about one-third. Higher reaction temperatures are also operable, but we have adopted a practical upper limit of about 200 °C. in order to avoid possible decomposition of the reactants or final product. Evolution of ammonia during the reaction carries off solvent from the field of reaction even when operating temperatures below the boiling point of the particular solvent are used. Accordingly, the reaction vessel used for carrying out the present process is preferably provided with a condenser to return to the vessel as reflux the solvent carried off by the ammonia.

Among the representative substituted ethanolamines which can be reacted with urea in accordance with reaction (I) above are the following:

N-methylethanolamine,
1-amino-2-propanol,
2-amino-1-propanol,
Tris(hydroxymethyl)aminomethane,
2-amino-2-methyl-1,3-propanediol,
Diethanolamine,
1-amino-2-methyl-2-propanol,
2-amino-2-methyl-1-propanol,
2-amino-1-butanol,
2-amino-2-methylbutanol, 3-amino-2-butanol
3-amino-2,3-dimethyl-2-butanol,
1-amino-2-methyl-2-butanol,
1-amino-3-methyl-2-butanol
3-amino-2-methyl-2-butanol,
3-amino-3-methyl-2-butanol,
3-amino-2-pentanol,
3-amino-3-methyl-2-pentanol,
2-amino-1-pentanol,
2-amino-4-methyl-1-pentanol,
2-amino-1-hexanol,
3-amino-2-hexanol,
2-amino-3-hexanol,
2-amino-4-ethyl-3-hexanol,
3-amino-4-heptanol,
3-amino-2-methyl-4-heptanol,
3-amino-3-methyl-4-heptanol,
1-amino-2-octanol,
5-amino-4-octanol,
2-amino-1-phenylethanol,
2-amino-1-phenyl-1-propanol,
2-amino-3-phenyl-1-propanol,
2-amino-3-phenyl-3-heptanol,
α-(Aminomethyl)benzyl alcohol,
α-(Aminomethyl)-p-chlorobenzyl alcohol,
α-(Aminomethyl)-p-methylbenzyl alcohol,
α-(Aminomethyl)-p-hydroxybenzyl alcohol,
α-(Aminomethyl)-m-hydroxybenzyl alcohol,
α-(Aminomethyl)-3,4-dihydroxybenzyl alcohol,
α-(Aminomethyl)-3,4,5-trimethylbenzyl alcohol,
α-(Aminomethyl)-α-methylbenzyl alcohol,
α-(Aminomethyl)-α-ethylbenzyl alcohol,
α-(Aminomethyl)-α-propylbenzyl alcohol,
2-amino-1-(3,4-dihydroxyphenyl)ethanol,
2-amino-1-(3,4-dihydroxyphenyl)-1-butanol,
2-amino-1,1-diphenylethanol,
2-amino-1,2-diphenylethanol,
2-amino-1,2-di-(p-chlorophenyl)ethanol,
2-amino-2,2-diphenylethanol,
2-aminocyclohexanol.

Generally speaking, any solvent for urea, for ethanolamine or substituted ethanolamine, and for the intermediate substituted or unsubstituted β-hydroxyethylurea, which solvent is substantially unreactive with these materials and with the corresponding 2-oxazolidinones, is liquid at the reaction temperature, and which has a boiling point of about 150° C. or higher, may be used in the present process. Examples of suitable solvents are tetramethylurea, tetraethylurea, dimethyldiethylurea, dimethylformamide, methyl "Carbitol" (diethyleneglycol monomethyl ether), ethyl "Carbitol" (diethyleneglycol monoethyl ether), butyl "Carbitol" (diethyleneglycol monobutyl ether), methyl pyrrolidone, dipropyleneglycol methyl ether, and the alkoxy-alkanols (monoalkyl ethers of ethylene- and diethylene glycol) and their carbamates. While the ratio of solvent to reactants can be varied over a wide range, we have obtained particularly good results using a ratio of 75 to 125 ml. of solvent per gram mole of reactants. Although higher ratios of solvent to reactants may be used, it has been our experience that yields decrease slowly as the ratio of solvent to reactants is increased much beyond the foregoing ratio range.

In practicing the present process, using urea and ethanolamine as illustrative starting reactant materials, equimolar quantities of the reactants together with a solvent such as those described above, e.g., dimethylformamide, are placed in a suitable reaction vessel and heated at 150 to 200° C. until the reaction is complete, as determined by the evolution of substantially the theoretical amount of ammonia. The solvent is then removed from the reaction mixture by distillation, preferably at reduced pressure, and the 2-oxazolidinone remaining in the residue is recovered by recrystallization from chloroform, methyl ethyl ketone, or other suitable solvent, or by distillation at reduced pressure. The pressure employed during distillation of the reaction mixture for removal of the solvent, and during recovery of the product from the remaining residue, should be such that the temperature of the material being heated does not exceed about 200° C., to avoid decomposition of the product.

In an alternative procedure, equimolar quantities of urea and ethanolamine are dissolved in butyl "Carbitol" or methyl "Carbitol," and the resulting reaction mixture heated at 150 to 200° C. until the reaction is substantially complete, as determined by the revolution of substantially the theoretical amount of ammonia. The reaction mixture is then cooled, e.g., to about —5° to 0° C., whereupon the 2-oxazolidinone crystallizes out and is recovered by filtration. The filtrate is suitable for further use in subsequent reactions. Yields by this method are somewhat lower (about 65% of theory) than that produced by the process described immediately above; however, the product is of higher purity and can be used in many cases without further purification. Most of the solvent which remains with the product can be removed by one washing with ether, and filtering.

The following examples, which are given for the purposes of illustration only, will exemplify our invention in more detail, it being understood that these examples are not to be construed in a limiting sense. All parts are by weight.

*Example 1*

β-Hydroxyethylurea, 20.8 parts, in 200 parts tetramethylurea was heated under reflux at about 160° C. for 6 hours in an apparatus designed to trap evolved ammonia in standard acid. During the reaction period 3.23 parts of ammonia (95.3% of theory) were evolved. The ammonia evolved caused apparent reflux of the solvent even though the reaction temperature was below the boiling point of the solvent. The solvent, tetramethylurea, was removed from the reaction mixture by distillation under reduced pressure and the residue was recrystallized from chloroform to give 12.8 parts (73.5% of theory) of 2-oxazolidinone, (melting range 85 to 87° C.).

*Example 2*

β-Hydroxyethylurea, 20.8 parts, in 200 parts of dimethylformamide was heated under reflux at about 160° C. in the apparatus described in Example 1. During the 6 hours reaction period 3.34 parts of ammonia (98.5% of theory) was evolved. The solvent, dimethylformamide, was removed from the reaction mixture by distillation under reduced pressure and the residue recrystallized from chloroform to give 14.5 parts (83.3% of theory) of 2-oxazolidinone.

*Example 3*

Urea, 12.0 parts, and ethanolamine, 12.2 parts, in 100 parts dimethylformamide as a solvent were heated under reflux at about 160° C. in the apparatus described in Example 1 for 5 hours. During the reaction period 100% of the theoretical amount of ammonia was evolved. The solvent was removed from the reaction mixture by distillation under reduced pressure, and the residue recrystallized from methyl ethyl ketone to give 14.1 parts 2-oxazolidinone, representing 81% of the theoretical yield.

*Example 4*

Urea, 12.0 parts, and ethanolamine, 12.2 parts, in 100 parts tetramethylurea as a solvent were heated under reflux at about 160° C. in the apparatus described in Example 1 for 4 hours. During the reaction period, 100% of the theoretical amount of ammonia was evolved. The solvent was removed from the reaction mixture by distillation under reduced pressure, and the residue recrystallized from methyl ethyl ketone to give 15.1 parts (86.8% of theory) of 2-oxazolidinone.

*Example 5*

Urea, 12.0 parts, and ethanolamine, 12.2 parts, in 100 parts N-methyl-2-pyrrolidone as a solvent were heated under reflux at about 160° C. in the apparatus described in Example 1. During the 4.5 hour reaction period 100% of the theoretical amount of ammonia was evolved. The solvent was removed from the reaction mixture by distillation under reduced pressure, and the residue recrystallized from chloroform to give 14.3 parts (82.3%) of 2-oxazolidinone.

*Example 6*

Urea, 12.0 parts, and ethanolamine, 12.2 parts, in 100 parts diethyleneglycol diethylether as a solvent were heated under reflux at about 160° C. for 6 hours in the apparatus described in Example 1. The solvent was removed from the reaction mixture by distillation under reduced pressure, leaving as a residue 16.8 parts (96% of theory) of crude 2-oxazolidinone which was purified by recrystallization from chloroform and from methyl ethyl ketone with charcoal treatment to give pure 2-oxazolidinone.

*Example 7*

Urea, 12.0 parts, and ethanolamine, 12.2 parts, in 50 parts butyl "Carbitol" as a solvent were heated at 160° C. for 6 hours. During the reaction period 92% of the theoretical amount of ammonia was evolved. The reaction mixture was cooled to −5° C. and filtered, to give 9.2 parts (52.9% of theory) of 2-oxazolidinone, which melted at 88 to 89° C. The filtrate was used as the solvent in an identical second reaction to give a yield of 65% of theory. Using the same procedure with methyl "Carbitol" a yield of 73.5% of theory was obtained.

*Example 8*

Urea, 12.0 parts, and ethanolamine, 12.2 parts, in 30 parts dipropylene glycol methylether as a solvent were reacted at 160° C. for 6 hours. During this time 94.5% of the theoretical amount of ammonia was evolved. The solvent was removed from the reaction mixture by distillation under reduced pressure, and the residue recrystallized from ethylenedichloride to give 12.2 parts (70.2% of theory) of 2-oxazolidinone.

*Example 9*

Urea, 12.0 parts, and 1-amino-2-propanol, 15.0 parts, in 50 parts dimethylformamide as a solvent, were heated at 160° C. for six hours. During the reaction period 96% of the theoretical amount of ammonia was evolved. The solvent was removed from the reaction mixture by distillation under reduced pressure, and the residue distilled under reduced pressure to give 15.5 parts (77% of theory) of a clear liquid (5-methyloxazolidinone) which boiled at 110° to 111° C. at 0.1 to 0.2 mm. Hg abs.

*Example 10*

Urea, 12.0 parts, and tris(hydroxymethyl)aminomethane, 24.2 parts, in 50 parts dimethylformamide as a solvent were heated at 160° for 6 hours. During the reaction 99.7% of the theoretical amount of ammonia was evolved. The solvent was removed from the reaction mixture by distillation under reduced pressure, and the residue recrystallized from ethanol to give 20.2 parts (68.8% of theory) of 4,4-dihydroxymethyl oxazolidinone, M.P. 107–9° C.

*Example 11*

Urea, 12.0 parts, and 2-amino-2-methyl-1,3-propanediol, 21.0 parts, in 30 parts dimethylformamide as a solvent were heated at 160° C. for 6 hours. During the reaction 99.8% of the theoretical amount of ammonia was evolved. Solvent was removed from the reaction mixture by distillation under reduced pressure, and the residue recrystallized from methanol and then from acetone to give 19.0 parts (72.5% of theory) of 4-methyl-4-hydroxymethyl oxazolidinone; melting point 115° C.

*Example 12*

Urea, 180 parts, and N-methylethanolamine, 183 parts, in 250 parts tetramethylurea as a solvent were reacted at 140° C. for 2 hours and then under reflux (175° C.) for 14 hours. The solvent was distilled off from the reaction mixture, and the residue distilled under reduced pressure. A second distillation gave N-methyloxazolidinone as a colorless liquid, B.$_{1.5}$ 180° C.

We claim:

1. In the method of preparing an oxazolidinone of the formula:

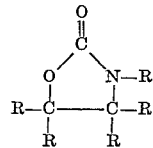

wherein R represents a member of the group consisting of hydrogen, lower alkyl, lower hydroxyalkyl, phenyl, benzyl, chlorophenyl, methylphenyl, hydroxyphenyl, dihydroxyphenyl and trihydroxyphenyl, the step which comprises heating at a temperature of at least 150° C., but below the decomposition temperature of said oxazolidinone, a urea derivative represented by the formula:

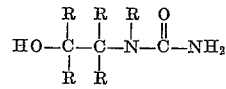

wherein R is as defined above and wherein no more than one of said R groups is other than hydrogen, in a solvent for said urea derivative which is substantially unreactive therewith and with said oxazolidinone, said solvent being liquid at said temperature.

2. In the method of preparing an oxazolidinone of the formula:

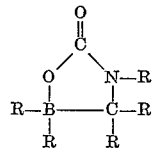

by heating urea together with a member of the group consisting of ethanolamine and substituted ethanolamines, wherein R represents a member of the group consisting of hydrogen, lower alkyl, lower hydroxyalkyl, phenyl, benzyl, chlorophenyl, methylphenyl, hydroxyphenyl, dihydroxyphenyl and trihydroxyphenyl, the improvement which comprises heating at a temperature between about 150° C. and about 200° C. equimolar quantities of urea and an amine represented by the formula:

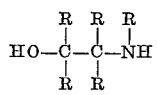

wherein R is as defined above and wherein no more than one of said R groups is other than hydrogen, in a solvent to form the intermediate corresponding urea derivative having the formula:

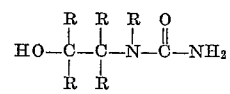

wherein R is as defined above and wherein no more than one of said R groups is other than hydrogen, and continuing heating the reaction mixture to thermally decompose said urea derivative to form said oxazolidinone, said solvent being a solvent for said urea, said amine and said urea derivative, and being substantially unreactive with any of said materials and with said oxazolidinone, said solvent being a liquid at said temperature.

3. A process for producing 2-oxazolidinone comprising heating at a temperature between about 150° and about 200° C. equimolar quantities of urea and ethanolamine in a solvent for urea, ethanolamine and β-hydroxyethylurea, said solvent being a liquid at said temperature and being substantially unreactive with said urea, ethanolamine, β-hydroxyethylurea and 2-oxazolidinone.

4. A process for producing 2-oxazolidinone comprising heating at a temperature between about 150° C. and about 200° C. equimolar quantities of urea and ethanolamine in a solvent for urea, ethanol amine and β-hydroxyethylurea until evolution of ammonia substantially ceases, removing said solvent from the reaction mixture by distillation, and recovering 2-oxazolidinone from the resulting residue, said solvent being a liquid at said temperature and being substantially unreactive with said urea, ethanolamine, β-hydroxyethylurea and 2-oxazolidinone.

5. In a process for producing 2-oxazolidinone by heating equimolar quantities of urea and ethanolamine, the improvement which comprises heating said urea and ethanolamine at a temperature between about 150° C. and about 200° C. in a solvent selected from the group consisting of diethyleneglycol monomethyl ether and diethyleneglycol monobutyl ether until the evolution of ammonia substantially ceases, cooling the reaction mixture to crystallize a fraction thereof, separating the liquid portion of said reaction mixture from said crystallized fraction, and recovering 2-oxazolidinone from said crystallized fraction.

6. A process for preparing 5-methyl oxazolidinone comprising heating at about 160° C. substantially equimolar quantities of urea and 1-amino-2-propanol in dimethylformamide as a solvent, until the evolution of ammonia substantially ceases, removing said solvent from the reaction mixture by distillation, and recovering 5-methyl oxazolidinone from the resulting residue.

7. A process for preparing 4,4-dihydroxymethyl oxazolidinone comprising heating substantially equimolar quantities of urea and tris(hydroxymethyl)aminomethane in dimethyl formamide as a solvent at about 160° C. until the evolution of ammonia has substantially ceased, removing said solvent from the reaction mixture by distillation, and recovering 4,4-dihydroxymethyl oxazolidinone from the resulting residue.

8. A process for preparing 4-methyl-4-hydroxymethyl oxazolidinone comprising heating substantially equimolar quantities of urea and 2-amino-2-methyl-1,3-propanediol in dimethylformamide as a solvent, at about 160° C. until the evolution of ammonia substantially ceases, distilling said solvent from the reaction mixture, and recovering 4-methyl-4-hydroxymethyl oxazolidinone from the resulting residue.

9. In a process of preparing an oxazolidinone by heating β-hydroxyethylurea, the improvement which comprises heating said β-hydroxyethylurea at a temperature of about 150° to about 200° C., but below the decomposition temperature of said oxazolidinone, in an organic solvent for said β-hydroxyethylurea which is unreactive therewith and with said oxazolidinone, said solvent being a liquid at said temperature, and recovering 2-oxazolidinone from the resulting mass.

10. In a process of preparing 2-oxazolidinone by heating equimolar quantities of urea and ethanolamine, the improvement which comprises heating said urea and ethanolamine at a temperature of at least 150° C., but below the decomposition temperature of said 2-oxazolidinone, in an organic solvent for urea, ethanolamine and β-hydroxyethylurea and which is unreactive with any of said materials and with 2-oxazolidinone, said solvent being a liquid at said temperature, and recovering 2-oxazolidinone from the reaction mixture.

11. A process for preparing N-methyloxazolidinone, comprising initially heating substantially equimolar quantities of urea and N-methylethanolamine in tetramethylurea as a solvent at about 140° C. for about 2 hours and then under reflux at about 175° C. for about 14 hours, thereafter distilling off the solvent from the reaction mixture, and recovering N-methyloxazolidinone from the resulting residue.

12. A method in accordance with claim 13, wherein said solvent is selected from the group consisting of tetramethylurea, tetraethylurea, dimethyldiethylurea, dimethylformamide, diethyleneglycol monomethyl ether, diethyleneglycol monoethyl ether, diethyleneglycol mono-n-butyl ether, methyl pyrrolidone, dipropyleneglycol methyl ether, monoalkyl ethers of ethylene- and diethylene glycol, and carbamates of monalkyl ethers of ethylene- and diethylene glycol.

13. A process of preparing 2-oxazolidinone, comprising heating, at a temperature between about 150° and about 200° C., β-hydroxyethylurea in an organic solvent therefor which is unreactive therewith and with 2-oxazolidinone, said solvent being a liquid at said temperature.

References Cited in the file of this patent
UNITED STATES PATENTS
2,755,286   Bell et al. _____ July 17, 1956

OTHER REFERENCES

Knorr et al.: Ber. Deut. Chem., volume 36, pages 1280–81 (1903).

Charlton et al.: Chem. Abstracts, volume 31, column 4957 (1937).

Paquin: Chem. Abstracts, volume 42, page 124 (1948).